(12) United States Patent
Petersen

(10) Patent No.: US 10,403,005 B2
(45) Date of Patent: Sep. 3, 2019

(54) USING SIGNED DISTANCE FIELDS IN MULTICOLORED VECTOR APPROXIMATION

(71) Applicant: Adobe Inc., San Jose, CA (US)

(72) Inventor: Scott Edward Petersen, Redwood City, CA (US)

(73) Assignee: Adobe Inc., San Jose, CA (US)

( * ) Notice: Subject to any disclaimer, the term of this patent is extended or adjusted under 35 U.S.C. 154(b) by 32 days.

(21) Appl. No.: 15/729,396

(22) Filed: Oct. 10, 2017

(65) Prior Publication Data

US 2019/0108657 A1   Apr. 11, 2019

(51) Int. Cl.
*G06T 11/00* (2006.01)
*G06T 1/20* (2006.01)
*G06T 11/20* (2006.01)

(52) U.S. Cl.
CPC .............. *G06T 11/001* (2013.01); *G06T 1/20* (2013.01); *G06T 11/206* (2013.01)

(58) Field of Classification Search
None
See application file for complete search history.

(56) References Cited

U.S. PATENT DOCUMENTS

| 2010/0177328 | A1* | 7/2010 | Li | H04N 1/40 358/1.9 |
| 2017/0277187 | A1* | 9/2017 | Refai | G06T 7/30 |
| 2017/0287162 | A1* | 10/2017 | Wasik | G06T 7/579 |

* cited by examiner

*Primary Examiner* — Michelle Chin
(74) *Attorney, Agent, or Firm* — SBMC

(57) ABSTRACT

Techniques and systems are described in which signed distance fields (SDFs) can be used to approximate multicolored vector art. A source image, represented as multicolored vector art is received and processed to provide a multicolored planar graph. The graph is processed to provide a SDF mask for each of the colors in the graph. For each of the colors in the graph, a color plane is generated, paired with the corresponding mask and represents the source image's color underneath the mask. Each color plane can be dilated and then one or more of the color planes or masks can be down sampled and then used to synthesize a source image which provides an approximated source image which retains the hard edges of the original image.

20 Claims, 9 Drawing Sheets

Example 1

Example 2

USING SIGNED DISTANCE FIELDS IN MULTICOLORED VECTOR APPROXIMATION

BACKGROUND

As the power and complexity of personal computer systems increase, graphics operations are increasingly being performed using dedicated graphics rendering devices referred to as graphics processing units (GPUs). As used herein, the terms "graphics processing unit" and "graphics processor" are used interchangeably. GPUs are often used in removable graphics cards that are coupled to a motherboard via a standardized bus (e.g., AGP, PCI, or PCI Express). GPUs may also be used in game consoles and in integrated graphics solutions (e.g., for use in some portable computers and lower-cost desktop computers). Although GPUs vary in their capabilities, they may typically be used to perform such tasks as rendering of two-dimensional (2D) graphical data, rendering of three-dimensional (3D) graphical data, accelerated rendering of graphical user interface (GUI) display elements, and digital video playback. A GPU may implement one or more application programmer interfaces (APIs) that permit programmers to invoke the functionality of the GPU.

To reduce demands on central processing units (CPUs) of computer systems, GPUs may be tasked with performing operations that would otherwise contribute to the CPU load. Accordingly, modern GPUs are typically implemented with specialized features for efficient performance of common graphics operations. For example, a GPU often includes multiple execution channels that can be used simultaneously for highly parallel processing. A GPU may include various built-in and configurable structures for rendering digital images to an imaging device.

Digital images may include raster graphics, vector graphics, or a combination thereof. Vector graphics data may be stored and manipulated as one or more geometric objects built with geometric primitives. The geometric primitives (e.g., points, lines, polygons, Bezier curves, and text characters) may be based upon mathematical equations to represent parts of digital images. Raster graphics data (also referred to as "bitmaps") may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values.

Digital video may include such digital images. For example, a digital video sequence may include multiple frames. Each frame may include one or more digital images. Each of the digital images in a frame may include transparency information which is used to determine how the images are combined in the frame. A digital video editing program, such as a video compositing application, may be used to create and edit a digital video sequence.

One of the basic problems posed to graphics processors pertains to how to efficiently and quickly render multicolored vector art or, more accurately, how to efficiently and quickly render an acceptable approximation, e.g. a smaller version, of arbitrarily-colored vector art. For example, a graphics application may allow a user to design a video containing content such as images, text, or iconography. The text and iconography constitute the multicolored vector art and are represented by vectors, curves, lines, and the like. The text and iconography are not the images. This is an important distinction because certain effects can be applied to the text and iconography that would not look as good on the images. Such effects can include, for example, zooming in and out, spinning in 3-D space, and the like. One area of application is in interactive applications such as computer games, where these types of effects are applied quite frequently.

Often times when such effects are applied to images, content of the image can become undesirably visually distorted. For example, once an image is magnified, the edge of a given color in the image starts to get very close to the camera or point of view, and one can start to see the corresponding pixels fairly clearly and various other artifacts, such as pixels that are undesirably and inaccurately spaced relative to one another. This is undesirable and can degrade the user's experience.

Approaches have been attempted, in the past, to deal with this problem. One typical solution or approach is to pre-rasterize vector art to a raster image and use the image as a texture. This solution is undesirable because it is slow and inefficient and requires an undesirable amount of resource overhead. Another solution is to tessellate the vector art and use the GPU to fill triangles or other primitives provided by the tessellation. Again, this solution is undesirable because of the processing inefficiencies and undesirable amount of resource overhead required. These and other solutions can also lead to visually-displeasing results due to visually-perceptible and fairly undesirable color distortions at the boundaries or edges of images.

SUMMARY

Techniques and systems are described in which signed distance fields (SDFs) are used in a graphics process to approximate multicolored vector art. In the context of this document, "multicolored vector art" is intended to describe a source image, defined by vectors, that includes three or more colors, e.g., art other than monochrome art. A signed distance field is an image where each pixel is defined to encode a distance from the pixel itself to the nearest pixel that is of an opposite type. To define a pixel "type", for the purpose of determining what constitutes an "opposite type", the notion of "inside" and "outside" is used. So, for example, in a black and white image, the black parts of the image may be considered as "inside" and the white parts of the image may be considered as "outside." So, a signed distance field provides a quick way of looking up how far it is from any given pixel to the inside. Thus, if a pixel is "outside", it may contain "+10" if it is 10 pixels away from an "inside" pixel. Likewise, if a pixel is "inside" it may contain "−10" if it is 10 pixels away from an "outside" pixel. The signed (i.e. the "+" or "−") distance field thus provides an image where the outline of the "inside" versus the "outside" or "boundary" is where the signed distance equals "0". Thus, the boundary is maintained when the image is reduced which, in turn, continues to provide a hard edge which is retained during image reduction. Specifically, the bilinear filtering that GPUs perform and the use of SDFs that are leveraged by at least some embodiments described herein result in bilinear curves along the boundary of arbitrary threshold values. Bilinear filtering, also referred to as bilinear interpolation, is an extension of linear interpolation for interpolating functions of two variables (e.g., x and y) on a rectilinear 2D grid. The idea is to perform linear interpolation first in one direction, and then again in the other direction. In the implementations described herein, a threshold of 0 is used against N single channel textures. In texture mapping, bilinear filtering can be used to produce a reasonably realistic image. An algorithm is used to map a screen pixel location to a corresponding point on a texture map. A weighted average of the attributes (color, transparency, etc.) of the four surrounding texels (i.e., texture pixels) is computed and applied to the screen pixel. In one or more embodiments, this process is repeated for pixels forming the object being textured. When an image needs to be scaled, pixels of the original image need to be moved in a certain direction based on the scale constant. However, when scaling an image by a non-integral scale factor, there are pixels (i.e. holes) that are not assigned appropriate pixel values. In this case, those holes should be assigned appropriate color values so that the output image does not have non-valued pixels. In embodiments that utilize bilinear interpolation, also referred to as bilinear filtering in texture mapping, such can be used where perfect image transformation with pixel matching is not possible, so that one can calculate and assign appropriate intensity values to pixels. Unlike other interpolation techniques, bilinear interpolation uses values of only the four nearest pixels, located in diagonal directions from a given pixel, in order to find the appropriate color intensity values of that pixel. Bilinear interpolation considers the closest 2×2 neighborhood of known pixel values surrounding the unknown pixel's computed location. It then takes a weighted average of these four pixels to arrive at its final, interpolated value. This approach, as will be appreciated by the skilled artisan, reduces some of the visual distortion caused by resizing an image to a non-integral factor, as opposed to other approaches such as the nearest-neighbor interpolation, which will make some pixels appear larger than others in a resized image. In various embodiments, bilinear interpolation and the use of thresholds as described above yields hard edges in a reduced image which, in turn, eliminates or greatly mitigates visually-perceptible anomalies that a user would find distracting, inaccurate and visually displeasing.

In operation, a source image, i.e. vector art, is received and processed to provide a multicolored planar graph in which no two regions which touch have the same color. The notion of "color" as used in relation to the multi-colored graph refers to more of a label or tag for a region, rather than an actual color of the source image. In but one example, four or five colors (or more) can be used. Using four colors can be more computationally expensive than using five colors, as described below in more detail. Accordingly, processing efficiencies can be gained by using five colors. Choice of the colors and their use in providing the multicolored planar graph is based, at least in part, on principles associated with a theorem known as the "four-color theorem."

In mathematics, as will be appreciated by the skilled artisan, the four-color theorem states that, given any separation of a plane into contiguous regions, producing a figure called a "map"—here, termed a "multicolored planar graph", no more than four colors are required to color the regions of the map so that no two adjacent regions have the same color. Two regions are called "adjacent" if they share a common boundary that is not a corner, where corners are the points shared by three or more regions.

The multicolored planar graph is processed to provide a mask for each of the colors. In one embodiment, scalable vector graphics (SVGs) representing a source image are rasterized to two images. First, a color rasterization process is employed to process the corresponding SVG into an image of pixels which may contain gradients. Next, a segmentation rasterization is performed in which each shape in the SVG is given a unique solid color and rasterized. The corresponding image does not contain gradients and the area filled by a given gradient would be assigned a single, unique solid color. The multicolored planar graph is built by reducing the segmentation image to so-called "connected components" which are then colored with unique graph colors in order to distinguish between the connected components. The graph colors can be arbitrary colors that need not necessarily represent the true color associated with the source image. The graph colors constitute the labels or tags mentioned above. That is, the graph colors simply represent a way for the different connected components to be identified. For each of the graph colors, a signed distance field (SDF) mask is generated representing just that particular graph color. Then, for each of the graph colors, a color plane image is generated representing the source art's color data "underneath" a given graph color.

That is, in a five color embodiment, assume the graph colors are expressed as "color 0", "color 1", "color 2", "color 3", and "color 4". The masks are computed by computing a signed distance field (SDF) for each of the graph colors. In this case, there is an SDF mask for color 0, an SDF mask for color 1, an SDF mask for color 2, an SDF mask for color 3, and an SDF mask for color 4. Each SDF mask is now paired with a color plane to form masks/color plane pairs. A color plane represents the color "underneath" the regions represented by the signed distance field (SDF). That is, the color plane represents the source image's color data "underneath" a given graph color. The combination of a color plane and its paired mask represents a part of the source image in its proper color. Collectively, the combination of the SDF masks and their associated color planes represent the original source image in its original colors. The techniques can also be employed with deferred shading techniques, which are described below in more detail.

In embodiments, each color plane can be dilated, i.e. expanded, to ensure that no color plane "misses" due to any rounding errors or simplification of the corresponding signed distance field. The notion of dilation refers to a basic operation and mathematical morphology. The dilation operation usually uses a structuring element, e.g., a geometric operator such as a circle or square with a point of reference, for probing and expanding shapes contained in an input image, here the source image. In the illustrated and described embodiment, the color planes are dilated using a front marching algorithm to fill in space not explicitly covered by the original mask. A front marching algorithm is one in which a wavefront representing the boundary of a shape is evolved in such a way that the shape expands at a constant velocity in the direction of the shape's normal vector at any given point. This means that samples "near" the original coverage for a given plane will still very likely result in the desired color. An example of the principles of dilation is provided below in connection with FIG. 7.

At this point, the SDF images and the color plane images (whether 8 images in total for the 4-color case, or 10 images total for the 5-color case, or with more images and colors) could be combined to synthesize the source image rasterization. That is, for each synthesized pixel, a shader in the GPU samples each SDF and then selects a color from the color plane corresponding to the SDF whose sample yielded the largest positive value. In other words, for each given pixel, each SDF is analyzed. A color from the corresponding color plane is selected that corresponds to a value that indicates that the given pixel is "most inside" its region. If one has full resolution SDFs and full resolution color planes, the combination of those will provide a bit-for-bit original image.

Once the source image is converted to the mask/color plane pairs, the mask/color plane pairs can be arbitrarily down sampled as a form of compression. In doing so, features from the original source image will tend to become lost as the masks/color plane pairs become smaller. However, an approximation of the original source image will still remain that includes and retains hard edges and does not alias which, in turn, mitigates visual anomalies provided by the previous solutions. This is due to the use of the SDFs in the multicolored vector environment, in selecting the corresponding color to use in the down sampling process. The approximation of the original source image that retains the hard edges is due, at least in part, because the SDFs whose values were zero defined the boundaries or edges in the original source image. The bilinear filtering performed in the down sampling process used these SDF values in the interpolation process to result in bilinear curves along these boundaries, thus resulting in a reduced image which retains these hard edges.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
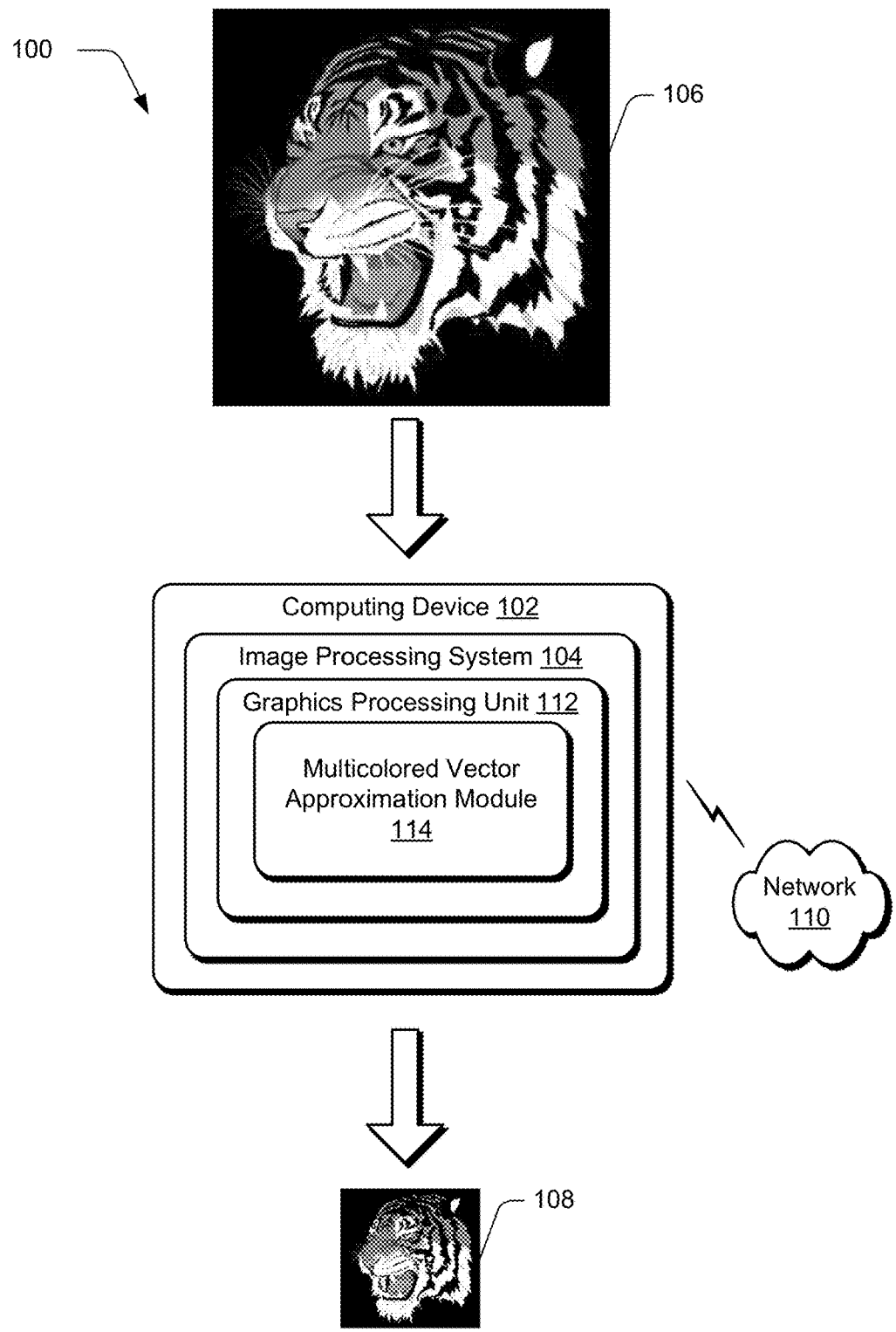
FIG. 1 is an illustration of an environment in an example implementation that is operable to employ the techniques described herein.

Techniques and systems are described in which signed distance fields (SDFs) are used in a graphics process to approximate multicolored vector art. In the context of this document, "multicolored vector art" is intended to describe a source image, defined by vectors, that includes three or more colors, e.g., art other than monochrome art. A signed distance field is an image where each pixel is defined to encode a distance from the pixel itself to the nearest pixel that is of an opposite type. To define a pixel "type", for the purpose of determining what constitutes an "opposite type", the notion of "inside" and "outside" is used. So, for example, in a black and white image, the black parts of the image may be considered as "inside" and the white parts of the image may be considered as "outside." So, a signed distance field provides a quick way of looking up how far it is from any given pixel to the inside. Thus, if a pixel is "outside", it may contain "+10" if it is 10 pixels away from an "inside" pixel. Likewise, if a pixel is "inside" it may contain "−10" if it is 10 pixels away from an "outside" pixel. The signed (i.e. "+" or "−") distance field thus provides an image where the outline of the "inside" versus the "outside" or "boundary" is where the signed distance equals "0". Thus, the boundary is maintained when the image is reduced which, in turn, continues to provide a hard edge which is retained during image reduction. Specifically, the bilinear filtering that GPUs perform and the use of SDFs that are leveraged by various embodiments described herein result in bilinear curves along the boundary of arbitrary threshold values.

Bilinear filtering, also referred to as bilinear interpolation, is an extension of linear interpolation for interpolating functions of two variables (e.g., x and y) on a rectilinear 2D grid. The idea is to perform linear interpolation first in one direction, and then again in the other direction. In the implementations described herein, a threshold of 0 is used against N single channel textures. In texture mapping, bilinear filtering can be used to produce a reasonably realistic image. An algorithm is used to map a screen pixel location to a corresponding point on a texture map. A weighted average of the attributes (color, transparency, etc.) of the four surrounding texels (i.e., texture pixels) is computed and applied to the screen pixel. This process is repeated for pixels forming the object being textured. When an image needs to be scaled, pixels of the original image need to be moved in a certain direction based on the scale constant. However, when scaling an image by a non-integral scale factor, there are pixels (i.e. holes) that are not assigned appropriate pixel values. In this case, those holes should be assigned appropriate color values so that the output image does not have non-valued pixels. In one or more embodiments, bilinear interpolation, also referred to as bilinear filtering in texture mapping, can be used where perfect image transformation with pixel matching is not possible, so that one can calculate and assign appropriate intensity values to pixels. Unlike other interpolation techniques, bilinear interpolation uses values of only the four nearest pixels, located in diagonal directions from a given pixel, in order to find the appropriate color intensity values of that pixel. Bilinear interpolation considers the closest 2×2 neighborhood of known pixel values surrounding the unknown pixel's computed location. It then takes a weighted average of these four pixels to arrive at its final, interpolated value. This approach, as will be appreciated by the skilled artisan, reduces some of the visual distortion caused by resizing an image to a non-integral factor, as opposed to other approaches such as the nearest-neighbor interpolation, which will make some pixels appear larger than others in a resized image. In one or more embodiments, bilinear interpolation and the use of thresholds as described above yields hard edges in a reduced image which, in turn, eliminates or greatly mitigates visually-perceptible anomalies that a user would find distracting, inaccurate and visually displeasing.

In operation, a source image, i.e., vector art, is received and processed to provide a multicolored planar graph in which no two regions which touch have the same color. The notion of "color" as used in relation to the multi-colored graph refers to more of a label or tag for a region, rather than an actual color of the source image. In but one example, four or five colors (or more) can be used. Using four colors can be more computationally expensive than using five colors, as described below in more detail. Accordingly, processing efficiencies can be gained by using five colors. Choice of the colors and their use in providing the multicolored planar graph is based, at least in part, on principles associated with a theorem known as the "four-color theorem."

In mathematics, as will be appreciated by the skilled artisan, the four-color theorem states that, given any separation of a plane into contiguous regions, producing a figure called a "map"—here, termed a "multicolored planar graph", no more than four colors are required to color the regions of the map so that no two adjacent regions have the same color. Two regions are called "adjacent" if they share a common boundary that is not a corner, where corners are the points shared by three or more regions.

The multicolored planar graph is processed to provide a mask for each of the colors. In one embodiment, scalable vector graphics (SVGs) representing a source image are rasterized to two images. First, a color rasterization process is employed to process the corresponding SVG into an image of pixels which may contain gradients. Next, a segmentation rasterization is performed in which each shape in the SVG is given a unique solid color and rasterized. The corresponding image does not contain gradients and the area filled by a given gradient would be assigned a single, unique solid color. The multicolored planar graph is built by reducing the segmentation image to so-called "connected components" which are then colored with unique graph colors in order to distinguish between the connected components. The graph colors can be arbitrary colors that need not necessarily represent the true color associated with the source image. The graph colors constitute the labels or tags mentioned above. That is, the graph colors simply represent a way for the different connected components to be identified. For each of the graph colors, a signed distance field (SDF) mask is generated representing just that particular graph color. Then, for each of the graph colors, a color plane image is generated representing the source art's color data "underneath" a given graph color.

That is, in a five color embodiment, assume the graph colors are expressed as "color 0", "color 1", "color 2", "color 3", and "color 4". The masks are computed by computing a signed distance field (SDF) for each of the graph colors. In this case, there is an SDF mask for color 0, an SDF mask for color 1, an SDF mask for color 2, an SDF mask for color 3, and an SDF mask for color 4. Each SDF mask is now paired with a color plane to form masks/color plane pairs. A color plane represents the color "underneath" the regions represented by the signed distance field (SDF). That is, the color plane represents the source image's color data "underneath" a given graph color. The combination of a color plane and its paired mask represents a part of the source image in its proper color. Collectively, the combination of the SDF masks and their associated color planes represent the original source image in its original colors. The techniques can also be employed with deferred shading techniques. Deferred shading refers to a screen-space shading technique. As will be appreciated by the skilled artisan, the technique is referred to as "deferred" because no shading is actually performed in the first pass of the vertex and pixel shaders. Instead, shading is deferred until a second pass. On the first pass of a deferred shader, only data that is required for shading computation is gathered. Positions, normals, and materials for each surface are rendered into a geometry buffer using "render to texture". After this, a pixel shader computes the direct and indirect lighting at each pixel using the information of the texture buffers in screen space.

In embodiments, each color plane can be dilated, i.e. expanded, to ensure that no color plane "misses" due to any rounding errors or simplification of the corresponding signed distance field. The notion of dilation refers to a basic operation and mathematical morphology. The dilation operation usually uses a structuring element, e.g., a geometric operator such as a circle or square with a point of reference, for probing and expanding shapes contained in an input image, here the source image. In the illustrated and described embodiment, the color planes are dilated using a front marching algorithm to fill in space not explicitly covered by the original mask. A front marching algorithm is one in which a wavefront representing the boundary of a shape is evolved in such a way that the shape expands at a constant velocity in the direction of the shape's normal vector at any given point. This means that samples "near" the original coverage for a given plane will still very likely result in the desired color. An example of the principles of dilation is provided below in connection with FIG. 7.

At this point, the SDF images and the color plane images (whether 8 images in total for the 4-color case, or 10 images total for the 5-color case, or with more images and colors) could be combined to synthesize the source image rasterization. That is, for each synthesized pixel, a shader in the GPU samples each SDF and then selects a color from the color plane corresponding to the SDF whose sample yielded the largest positive value. In other words, for each given pixel, each SDF is analyzed. A color from the corresponding color plane is selected that corresponds to a value that indicates that the given pixel is "most inside" its region. If one has full resolution SDFs and full resolution color planes, the combination of those will provide a bit-for-bit original image.

Once the source image is converted to the mask/color plane pairs, the mask/color plane pairs can be arbitrarily down sampled as a form of compression. In doing so, features from the original source image will tend to become lost as the masks/color plane pairs become smaller. However, an approximation of the original source image will still remain that includes and retains hard edges and does not alias which, in turn, mitigates visual anomalies provided by the previous solutions. This is due to the use of the SDFs in the multicolored vector environment, in selecting the corresponding color to use in the down sampling process.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 10.

The computing device 102 is illustrated as including an image processing system 104. The image processing system 104 is implemented at least partially in hardware of the computing device 102 to use signed distance fields (SDF) in multicolored vector approximation, as described above and below. Specifically, the image processing system 104 is configured to receive a source image, such as source image 106, and process the source image to provide an approximated source image 108 through the use of signed distance fields which are employed to approximate the source image 106.

The approximated source image 108, by way of a suitably-configured user interface, is rendered on a display device of the computing device 102.

Although illustrated as implemented locally at the computing device 102, functionality of the image processing system 104 may also be implemented as whole or part via functionality available via a network 110, such as part of a web service or "in the cloud."

An example of functionality incorporated by the image processing system 104 to process the source image 106 is illustrated as a graphics processing unit 112 that includes or otherwise makes use of a multicolored vector approximation module 114. That is, although the multicolored vector approximation module 114 is illustrated as being included as part of the functionality of the graphics processing unit 112, the multicolored vector approximation module 114 can be implemented separately from the graphics processing unit 112. The graphics processing unit 112 and the multicolored vector approximation module 114 can, in at least some embodiments, communicating with each other by way of suitably-configured application program interfaces (APIs).

Figure 10:
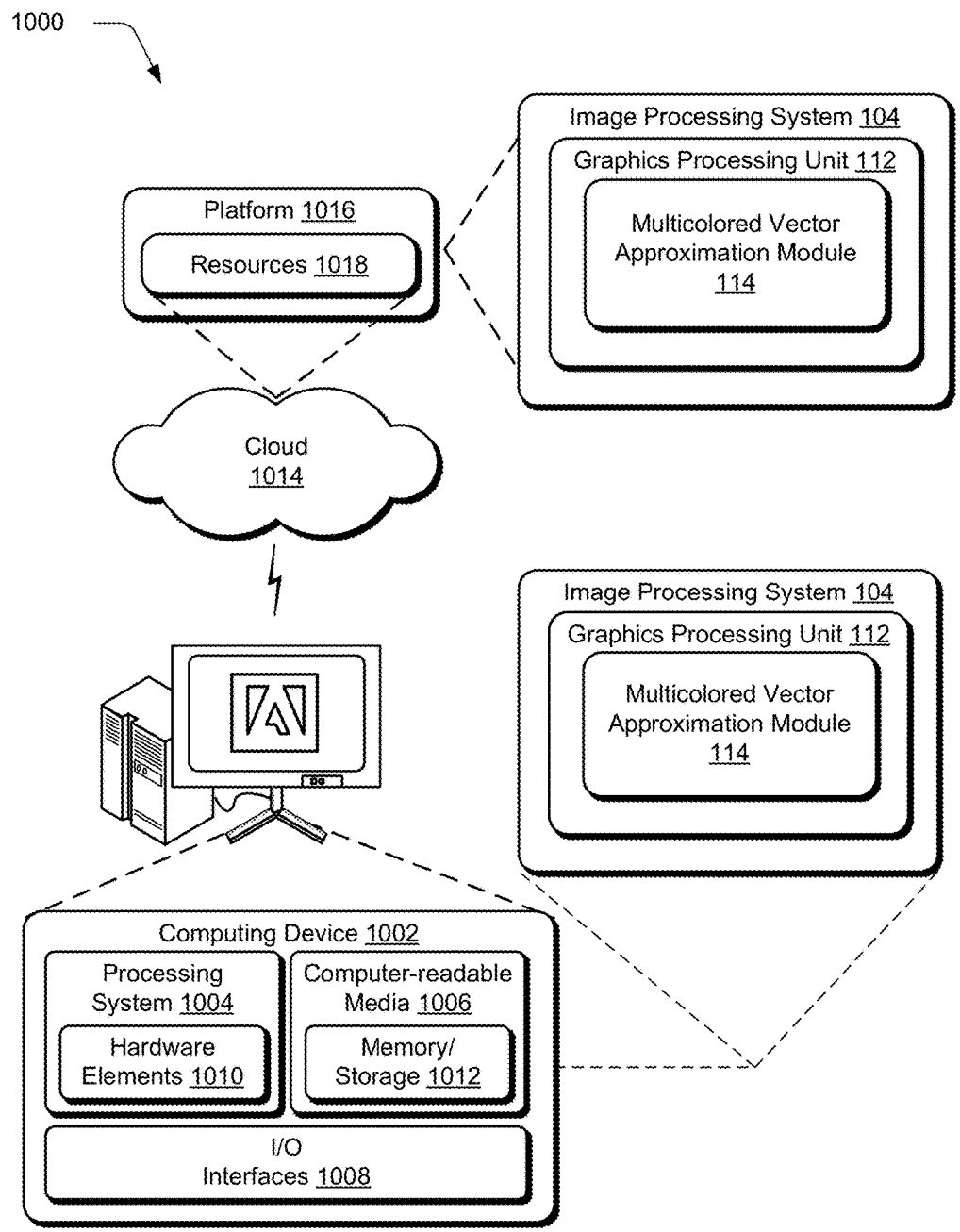
FIG. 10 illustrates an example system including various components of an example device that can be implemented as any type of computing device as described and/or utilize with reference to FIGS. 1-9 to implement embodiments of the techniques described herein.

The GPU 112 is configured to render images and video according to the techniques described herein. The GPU 112, also referred to herein as a graphics processor, may comprise a dedicated graphics rendering device associated with a computer system. An example of a suitable computer system for use with a GPU is illustrated in FIG. 10. The GPU 112 may include numerous specialized components configured to optimize the speed of rendering graphics output. For example, the GPU 112 may include specialized components for rendering three-dimensional models, for applying textures to surfaces, etc. For the sake of illustration, however, only a limited selection of components is shown in connection with the example GPU described herein. GPU architectures other than the example architecture described in this document may be usable for implementing the techniques described herein. The GPU 112 may implement one or more application program interfaces (APIs) that permit programmers to invoke the functionality of the GPU. For example, the GPU can include APIs that allow communication with and between the multicolored vector approximation module 114 as noted above. Suitable GPUs may be commercially available from vendors such as NVIDIA Corporation, ATI Technologies, and others.

The multicolored vector approximation module 114 is representative of functionality of the computing device 102 (e.g., implemented by a processing system and computer-readable storage medium) to utilize signed distance fields (SDFs) in a graphics process to approximate multicolored vector art, as described above and below.

In operation, a source image 106, i.e., vector art, is received and processed to provide a multicolored planar graph in which no two regions which touch have the same color. The multicolored planar graph is processed to provide a SDF mask for each of multiple graph colors assigned to represent the source image. The multiple graph colors represent connected components which are distinguished by their associated graph colors. The graph colors can be arbitrary colors that need not necessarily represent the true color associated with an image. Rather, the graph colors simply represent a way for the different components to be identified. For each of the graph colors, a signed distance field (SDF) is generated representing just that graph color. Then, for each of the graph colors, a color plane image is generated representing the source art's color data "underneath" a given graph color.

Each SDF mask is now paired with a color plane to form masks/color plane pairs. A color plane represents the color "underneath" the regions represented by the signed distance field (SDF). That is, the color plane represents the source image's color data "underneath" a given graph color. The combination of a color plane and its paired mask represents a part of the source image in its proper color.

In embodiments, each color plane can be dilated to ensure that no color plane "misses" due to any rounding errors or simplification of the corresponding signed distance field. At this point, the SDF images and the color plane images (whether 8 images in total for the 4-color case, or 10 images total for the 5-color case) could be combined to synthesize the source image rasterization exactly. That is, for each synthesized pixel, a shader samples each SDF and then selects a color from the color plane corresponding to the SDF whose sample yielded the largest positive value. In other words, for each given pixel each SDF is analyzed. A color from the corresponding color plane is selected that corresponds to a value that indicates that the given pixel is "most inside" its region. If one has full resolution SDFs and full resolution color planes, the combination of those will provide a bit-for-bit original image.

Once the source image is converted to the mask/color plane pairs, the mask/color plane pairs can be arbitrarily down sampled as a form of compression. In doing so, features from the original source image will become lost as the masks/color plane pairs become smaller, but an approximation of the original source image will still remain that includes and retains hard edges and does not alias which, in turn, mitigates visual anomalies provided by the previous solutions. This is due to the use of the SDFs in selecting the corresponding color to use in the down sampling process.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Having considered an example environment in accordance with one or more embodiments, consider now an example graphics processing unit and multicolored vector approximation module in accordance with one or more embodiments.

Example Graphics Processing Unit and Multicolored Vector Approximation Module

Figure 2:
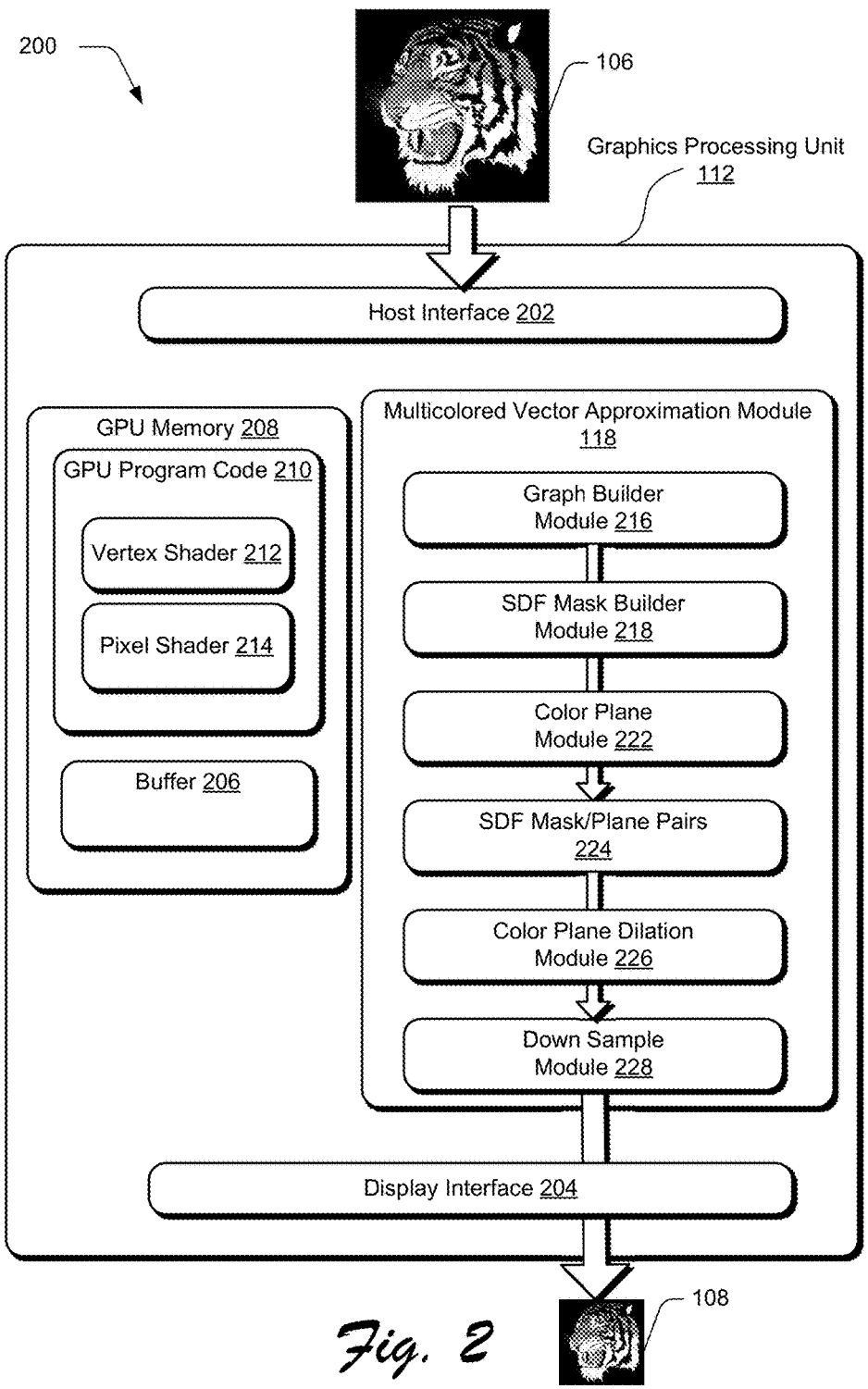
FIG. 2 is an illustration of an example system including a graphics processing unit and multicolored vector approximation module in accordance with one or more embodiments.

FIG. 2 is a block diagram illustrating one embodiment of a system, generally at 200, that includes an example graphics processing unit 112 from FIG. 1. A source image 106 is received and processed to provide an approximated source image 108. In some instances, GPU 112 is configured to receive the source image 106 and process the source image to provide the approximated source image 108 according to the techniques described herein. In other instances, the multicolored vector approximation module 118 can receive the source image 106 and, in connection with the graphics processing unit 112, process the source image to provide the approximated source image 108. In this instance, the GPU would be used for rendering the precomputed multicolored signed distance fields (SDF). The GPU 112, also referred to herein as a graphics processor, may comprise a dedicated graphics rendering device associated with a computer system. An example of a suitable computer system for use with a GPU is illustrated in FIG. 10.

GPU 112 may include numerous specialized components configured to optimize the speed of rendering graphics output. For example, the GPU 112 may include specialized components for rendering three-dimensional models, for applying textures to surfaces, etc. In the illustrated and described example, the GPU 112 is configured to utilize a multicolored vector approximation module 118 (FIG. 1). It is to be appreciated and understood, however, that while the multicolored vector approximation module 118 is shown as being included as part of the GPU, such module can comprise a separate module that is utilized by the GPU 112 in order to provide the approximated source image 108.

For the sake of illustration, only a limited selection of components is shown in the example GPU 112 of FIG. 2. It is to be appreciated and understood that GPU architectures other than the example architecture of FIG. 2 may be usable for implementing the techniques described herein. The GPU 112 may implement one or more application programmer interfaces (APIs) that permit programmers to invoke the functionality of the GPU. Suitable GPUs may be commercially available from vendors such as NVIDIA Corporation, ATI Technologies, and others.

The GPU 112 may include a host interface 202 configured to communicate with a data source (e.g., a communications bus and/or processor(s) of a host computer system) in order to receive source image 106. For example, the data source may provide the source image 106 and/or executable program code to the GPU 112. In some embodiments, the host interface 202 may permit the movement of data in both directions between the GPU 112 and the data source. The GPU 112 may also include a display interface 204 for providing output data, in this case, an approximated source image 108 to a data target. The data target may comprise an imaging device such as a display or printer. For example, if the data target comprises a display device, the GPU 112 (along with other graphics components and/or interfaces) may "drive" the display by providing graphics data at a particular rate from a screen buffer 206.

In various embodiments, the GPU 112 may include internal memory 208. The GPU memory 208, also referred to herein as "video memory" or "VRAM," may comprise random-access memory (RAM) which is accessible to other GPU components. The GPU memory 208 may be used in some embodiments to store various types of data and instructions such as input data, output data, intermediate data, program instructions for performing various tasks, etc. In one embodiment, the GPU 112 may also be configured to access a memory of a host computer system via the host interface 202.

In one embodiment, program instructions may be stored in the memory of the host computer system and executed by the host computer system to perform aspects of the techniques discussed herein. For example, the host computer system may send input such as one or more source images for processing by the GPU 112, including the multicolored vector approximation module 118.

In embodiments, the GPU 112 may include GPU program code 210 that is executable by the GPU 112 to perform aspects of the multicolored vector approximation discussed herein. For example, elements of the input, which may include vector art, received by host interface 202 may be rasterized to pixels during a rendering process including execution of the GPU program code 210 on the GPU 112. Elements of the GPU program code 210 may be provided to the GPU 112 by a host computer system that includes a data source and/or may be native to the GPU 112. The GPU program code 210 may comprise a vertex shader 212 and/or a pixel shader 214.

A vertex shader 212 comprises program instructions that are executable by the GPU 112 to determine properties (e.g., position) of a particular vertex. A vertex shader 212 may expect input such as uniform variables (e.g., constant values for each invocation of the vertex shader) and vertex attributes (e.g., per-vertex data). A pixel shader 214 comprises program instructions that are executable by the GPU 112 to determine properties (e.g., color) of a particular pixel. A pixel shader 214 may also be referred to as a fragment shader. A pixel shader 214 may expect input such as uniform variables (e.g., constant values for each invocation of the pixel shader) and pixel attributes (e.g., per-pixel data). In generating the approximated source image 108, the vertex shader 212 and/or the pixel shader 214 may be executed at various points in the graphics pipeline.

The GPU memory 208 may comprise one or more buffers 206. Each buffer 206 may comprise a two-dimensional array of pixel data (e.g., color values) and/or pixel metadata (e.g., depth values, stencil values, etc.). For example, the GPU memory 208 may comprise an image buffer that stores intermediate or final pixel values generated in the rendering process. In one embodiment, the image buffer may comprise a single-sampling buffer wherein each pixel in the buffer is represented by a single set of color and alpha values (e.g., one color value for a red channel, one color value for a green channel, one color value for a blue channel, and appropriate values for a one or more alpha channels). In one embodiment, the image buffer may comprise a multi-sampling buffer usable for anti-aliasing.

In the illustrated and described embodiment, the multicolored vector approximation module 118 includes a graph builder module 216, a signed distance field (SDF) mask builder module 218, a color plane module 222, SDF mask/ plane pairs 224, a color plane dilation module 226, and a down sample module 228, each of which is discussed under its own section just below.

Graph Builder Module—216

In one or more embodiments, when a source image is received, the source image is processed to provide a multicolored planar graph. The source image represents two-dimensional vector art and building the multicolored planar graph is accomplished by recognizing that any two-dimensional vector art is isomorphic to a planar map which can be colored with various colors such as four or five colors. By "isomorphic" is meant that the two-dimensional vector art is similar in form, shape, or structure to a planar map. Hence, principles that apply to building a planar map can be employed to build a multicolored planar graph by the graph builder module 216.

As noted above, choice of the colors and their use in providing the multicolored planar graph is based, at least in part, on principles associated with a theorem known as the "four-color theorem." In mathematics, as will be appreciated by the skilled artisan, the four-color theorem states that, given any separation of a plane into contiguous regions, producing a figure called a "map"—here, termed a "multicolored planar graph"—no more than four colors are required to color the regions of the map so that no two adjacent regions have the same color. Two regions are called "adjacent" if they share a common boundary that is not a corner, where corners are the points shared by three or more regions. However, computational complexities exist with respect to interpretation of the four-color theorem which present challenges when applied in the real world.

By analogy, consider the case of a map of the countries of the world. First, all corners, points that belong to three or more countries, must be ignored. In addition, maps including regions of finite area but infinite perimeter can require more than four colors. Second, for the purpose of the theorem, every "country" has to be a connected region, or contiguous. In the real world, this is not a true case, e.g., the upper and lower peninsulas of Michigan are not contiguous. Because all the territory of a particular country must be the same color, four colors may not be sufficient.

Figure 3:
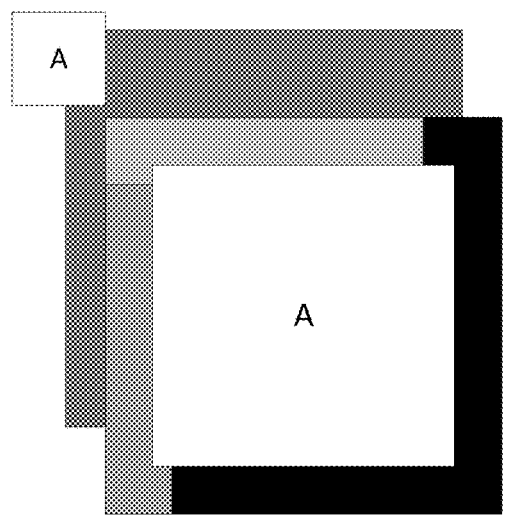
FIG. 3 is an illustration that describes aspects of the four-color theorem.

As an example, consider FIG. 3, which provides a simplified map with countries represented by the geometric shapes. In this map, the two regions labeled "A" belong to the same country and, according to the theorem, must be the same color. This map then requires five colors, since the two "A" regions together are contiguous with four other regions, each of which is contiguous with all the others. A similar construction applies if a single color is used for all bodies of water as is usual on real maps. For maps in which more than one country may have multiple disconnected regions, six or more colors might be required.

A simpler statement of the four-color theorem uses graph theory. The set of regions of the map can be represented more abstractly as an undirected graph that has a vertex for each region and an edge for every pair of regions that share a boundary segment. This graph is planar in that it can be drawn in the plane without crossings by placing each vertex at an arbitrarily chosen location within the region to which it corresponds, and by drawing the edges as curves that lead without crossing within each region from the vertex location to each shared boundary point of the region. Conversely, any planar graph can be formed from a map in this way. In graph-theoretic terminology, the four-color theorem states that the vertices of every planar graph can be colored with at most four colors so that no two adjacent vertices receive the same color or for short, "every planar graph is four-colorable."

This situation leads to computational complexities which, in turn, leads to inefficiencies in applying it to the various embodiments described herein. It is, however, certainly possible to use four colors in building the multicolored planar graph. However, it is much more computationally inexpensive to use five colors, based upon the five-color theorem which states that regions may be colored using no more than five colors in such a way that no two adjacent regions receive the same color.

Based upon the principles described above, a source image which is represented in scalable vector graphics (SVG) is rasterized into two images. First, a color rasterization process is employed to process the corresponding SVG into an image of pixels which may contain gradients. This image is used to construct the color planes described below. To construct the four or five color planes, the four or five graph colors are used individually as masks applied to this image. The result is the four or five color planes. Next, a segmentation rasterization is performed in which each shape in the SVG is given a unique solid color and rasterized. The corresponding image produced by the segment rasterization does not contain gradients and the area filled by a given gradient is assigned a single, unique solid color.

The multicolored planar graph is then built by the graph builder module 216 by reducing the segmentation image to so-called "connected components" which are then colored with unique graph colors in order to distinguish between the connected components. Connected components, also referred to as connected-component labeling, region labeling, or region extraction, is an algorithmic application of graph theory where subsets of connected components are uniquely labeled based on a given heuristic. Connected-component labeling is used in computer vision technology to detect connected regions in images such as binary digital images, color images, and data with higher dimensionality. Briefly, in connected-component labeling, a graph, containing vertices and connecting edges, is constructed from relevant input data. The vertices contain information required by the comparison heuristic, while the edges indicate connected "neighbors". An algorithm traverses the graph, labeling the vertices based on the connectivity and relative values of their neighbors. Connectivity can be determined by the medium; image graphs, for example, can be 4-connected or 8-connected. Following the labeling stage, the graph may be partitioned into subsets after which the original information can be recovered and processed.

Various algorithms can be employed to traverse the graph. For example, principles based upon a "one component at a time" algorithm can be employed—which is a very fast and simple method to implement. It is based on graph traversal methods in graph theory. In short, once the first pixel of a connected component is found, all the connected pixels of that connected component are labeled before going on to the next pixel in the image. This algorithm is part of Vincent and Soille's watershed segmentation algorithm described in Vincent, Luc; Soille, Pierre (June 1991), "Watersheds in digital spaces: an efficient algorithm based on immersion simulations". *IEEE Transactions on Pattern Analysis and Machine Intelligence*. 13 (6): 583. doi: 10.1109/34.87344.

Alternately, principles based upon a "two-pass" (or multi-pass) algorithm can be employed to traverse the graph. The two-pass algorithm is also relatively simple to implement and iterates through two-dimensional binary data. The algorithm makes two passes over the image: the first pass to assign temporary labels and record equivalences and the second pass to replace each temporary label by the smallest label of its equivalence class. Multiple passes can be made for more complex data, but the principles are similar or the same.

The unique graph colors which are used to color the connected components can be arbitrary colors that need not necessarily represent the true color associated with an image. Rather, the unique graph colors simply represent a way for the different components to be identified.

Figure 4:
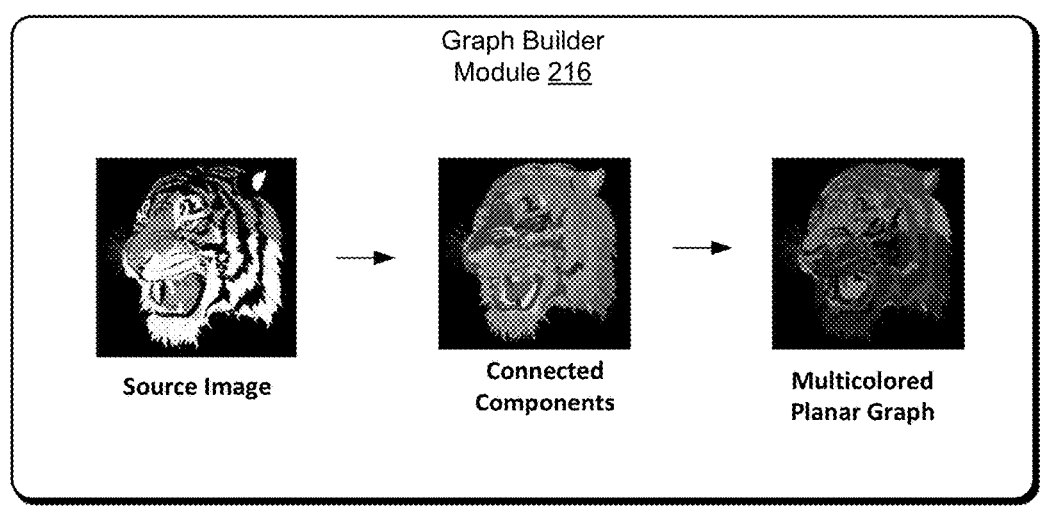
FIG. 4 illustrates an example graph builder module in accordance with one or more embodiments.

As an example, consider FIG. 4 which illustrates the graph builder module 216 having processed the source image of FIG. 1 to provide a connected components representation which is colored to provide the multicolored planar graph. In this particular example, five colors are used, but a four-coloring approach is possible, as noted above.

SDF Mask Builder Module —218

The multicolored planar graph produced by the graph builder module 216 is now processed by the Signed Distance Field (SDF) mask builder module 218 to provide a SDF mask for each of the colors. That is, for each of the graph colors, a signed distance field (SDF) is generated representing just that graph color.

Recall from above that a signed distance field (SDF) is an image where each pixel is defined to encode a distance from the pixel itself to the nearest pixel that is of an opposite type. To define a pixel "type", the notion of "inside" and "outside" is used. So, for example, in a black and white image, the black parts of the image may be considered as "inside" and the white parts of the image may be considered as "outside." So, a signed distance field provides a quick way of looking up how far it is from any given pixel to the inside. Thus, if a pixel is "outside", it may contain "+10" if it is 10 pixels away from an "inside" pixel. Likewise, if a pixel is "inside" it may contain "−10" if it is 10 pixels away from an "outside" pixel. The signed distance field thus provides an image where the outline of the "inside" versus the "outside" or "boundary" is where the signed distance equals "0". Thus, the boundary is maintained when the image is reduced which, in turn, continues to provide a hard edge.

Figure 5:
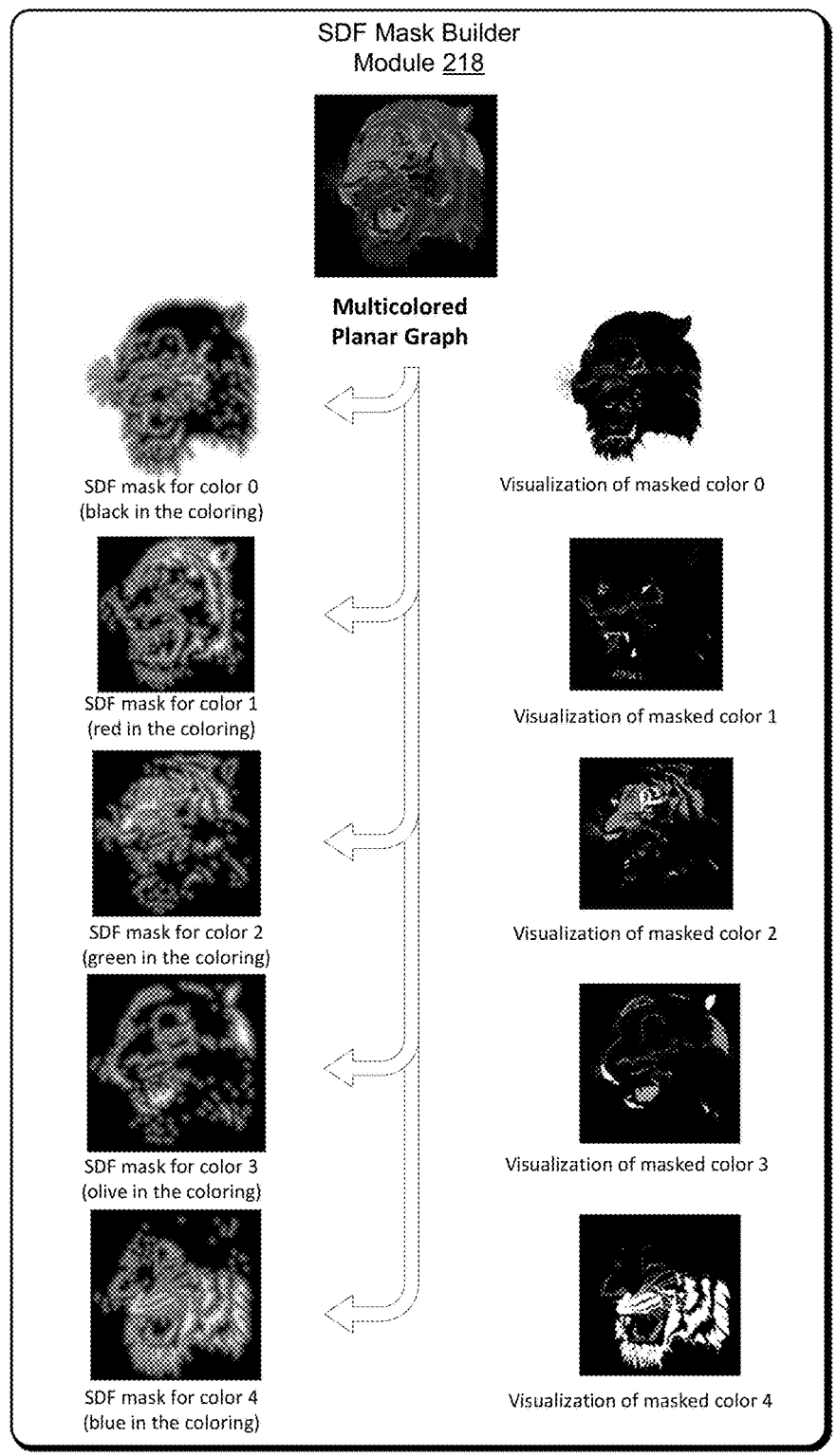
FIG. 5 illustrates an example SDF mask builder module in accordance with one or more embodiments.

As an example, consider FIG. 5. There, the SDF mask builder module 218 has processed the multicolored planar graph to provide five SDF masks, one for each graph color that appears in the multicolored planar graph.

That is, in the five color embodiment, assume the five graph colors are expressed as "color 0", "color 1", "color 2", "color 3", and "color 4". The masks, appearing on the left side of the SDF mask builder module 218, are computed by computing a signed distance field (SDF) for each of the graph colors. In this case, there is an SDF mask for color 0 (which is black in the multicolored planar graph), an SDF mask for color 1 (which is red in the multicolored planar graph), an SDF mask for color 2 (which is green in the multicolored planar graph), an SDF mask for color 3 (which is olive in the multicolored planar graph), and an SDF mask for color 4 (which is blue in the multicolored planar graph).

Directly across from each SDF mask appears a visualization of the corresponding masked color. The visualization of the masked color is not used by the system. Rather, the visualizations are provided to assist the reader in visualizing the context of and meaning behind each corresponding SDF mask.

Color Plane Module—222

Now, for each of the graph colors associated with a SDF mask, a color plane image is generated by the color plane module 222 and represents the source art's color data "underneath" a given graph color. A color plane represents the color "underneath" the regions represented by the signed distance field (SDF). That is, the color plane represents the source image's color data "underneath" a given graph color. The combination of a color plane and its paired mask represents a part of the source image in its proper color.

In other embodiments, color planes can be generated at the vector level. That is, once the graph coloring is done, one could compute which vector shapes the graph colors apply to and do separate vector-based rasterizations for each of them, only rendering for each color plane the shapes in the source SVG that correspond to that plane's associated graph color.

SDF Mask/Plane Pairs —224

Now that the color planes have been formed for each SDF mask, each SDF mask is paired with a color plane to form masks/color plane pairs. The combination of all of the mask/color plane pairs constitutes the original image in its proper colors.

Figure 6:
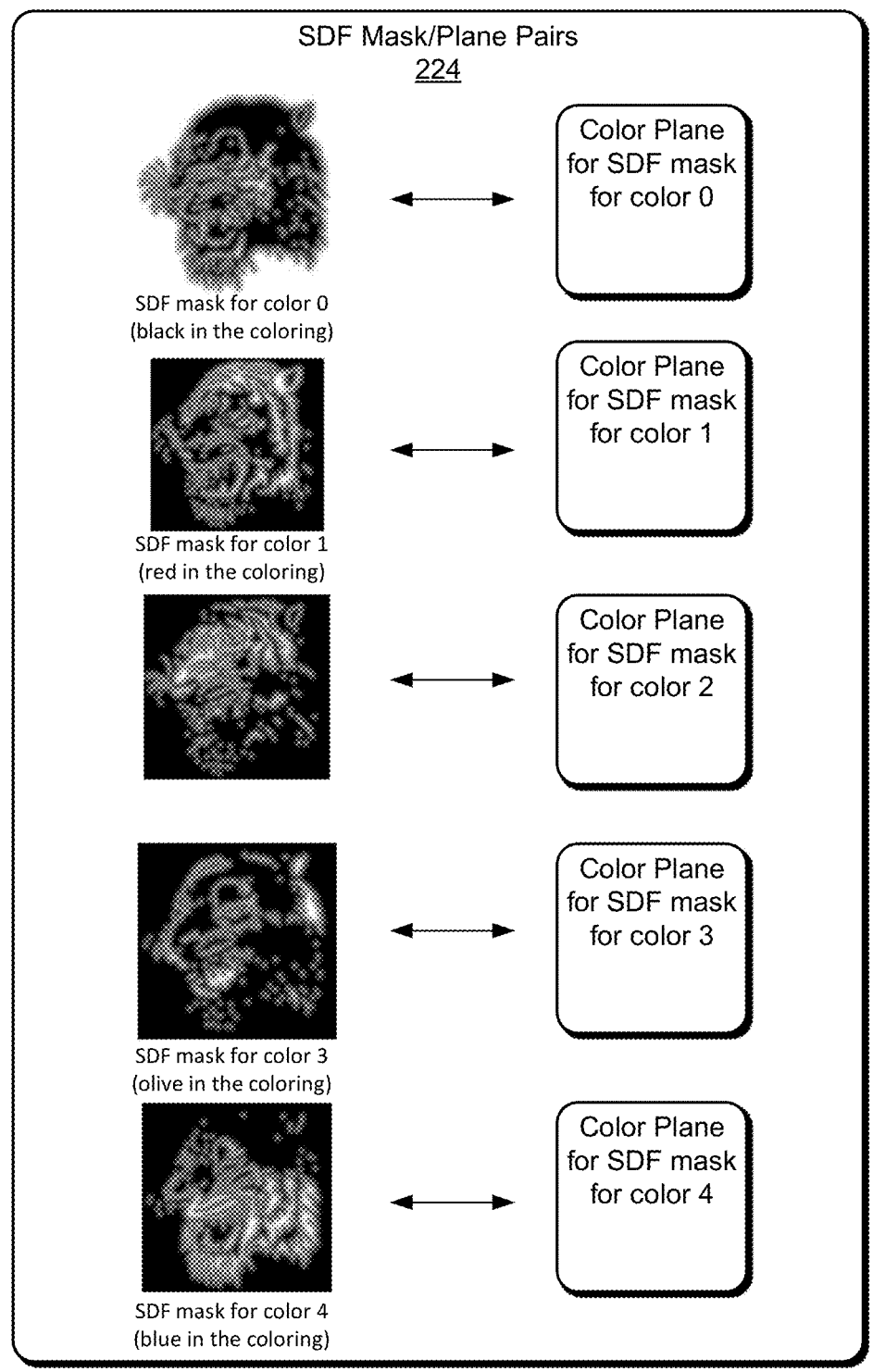
FIG. 6 illustrates example SDF mask/plane pairs in accordance with one or more embodiments.

As an example, consider FIG. 6 which shows each of the SDF masks paired with a corresponding color plane.

Color Plane Dilation Module—226

In embodiments, each color plane can be dilated by the color plane dilation module 226 to ensure that no color plane "misses" due to any rounding errors or simplification of the corresponding signed distance field. That is, in some instances there may be two color planes that have different signed distance fields that are mathematically close to each other. Due to the mathematical closeness of the signed distance fields, one SDF mask may be accidentally selected when the approximated source image is constructed. This may result in selection of an SDF mask that does not have a color at a particular location. If used to construct the approximated source image, such would result in a visually discernible anomaly. To mitigate the possibility of this situation arising, the color planes can be dilated or "expanded" to increase the chances that the right color is going to be selected from a given color plane.

Dilation represents a basic operation and mathematical morphology. The dilation operation usually uses a structuring element for probing and expanding shapes contained in an input image, here the source image. In the illustrated and described embodiment, the color planes are dilated using a front marching algorithm to fill in space not explicitly covered by the original mask. As noted above, a front marching algorithm is one in which a wavefront representing the boundary of a shape is evolved in such a way that the shape expands at a constant velocity in the direction of the shape's normal vector at any given point. This means that samples "near" the original coverage for a given plane will still very likely result in the desired color.

Figure 7:
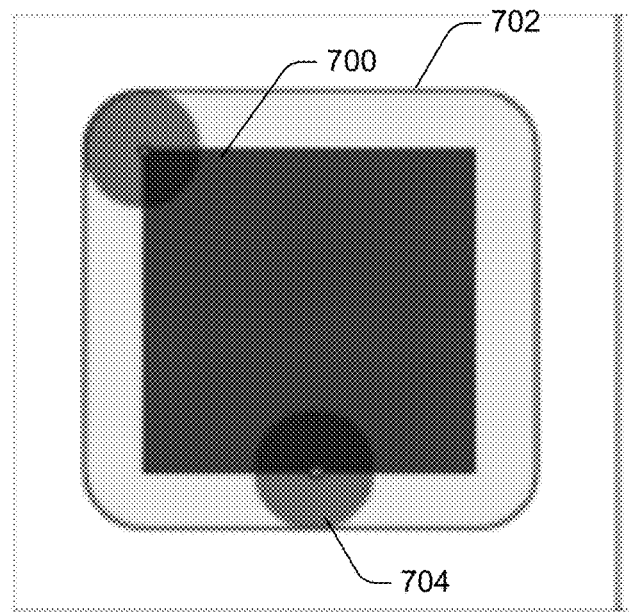
FIG. 7 illustrates aspects of color mask dilation in accordance with one or more embodiments.
Figure 7:
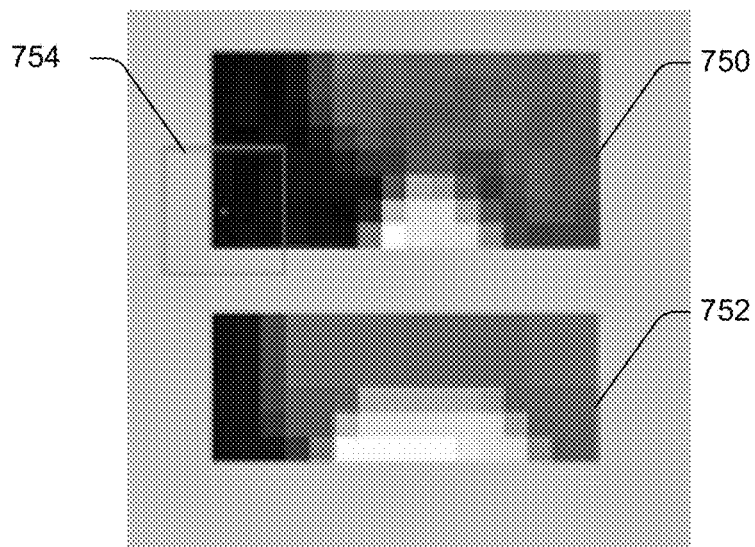

As a general example of dilation and the principles upon which it rests, consider FIG. 7, which shows two examples of dilation.

In the Example 1, a square 700 is to be dilated to form a resultant square 702. In order to do so, a structuring element 704 is used to "march" around the periphery of square 700 to expand the square to form the resultant square 702 with rounded corners.

In Example 2, FIG. 750 is to be dilated to form resultant FIG. 752. A 5×5 flat structuring element 754 is used for dilation. FIG. 750 demonstrates the application of structuring element 754 to the individual pixels of the figure. FIG. 752 demonstrates the resultant FIG. 752 after application of the structuring element.

Figure 8:
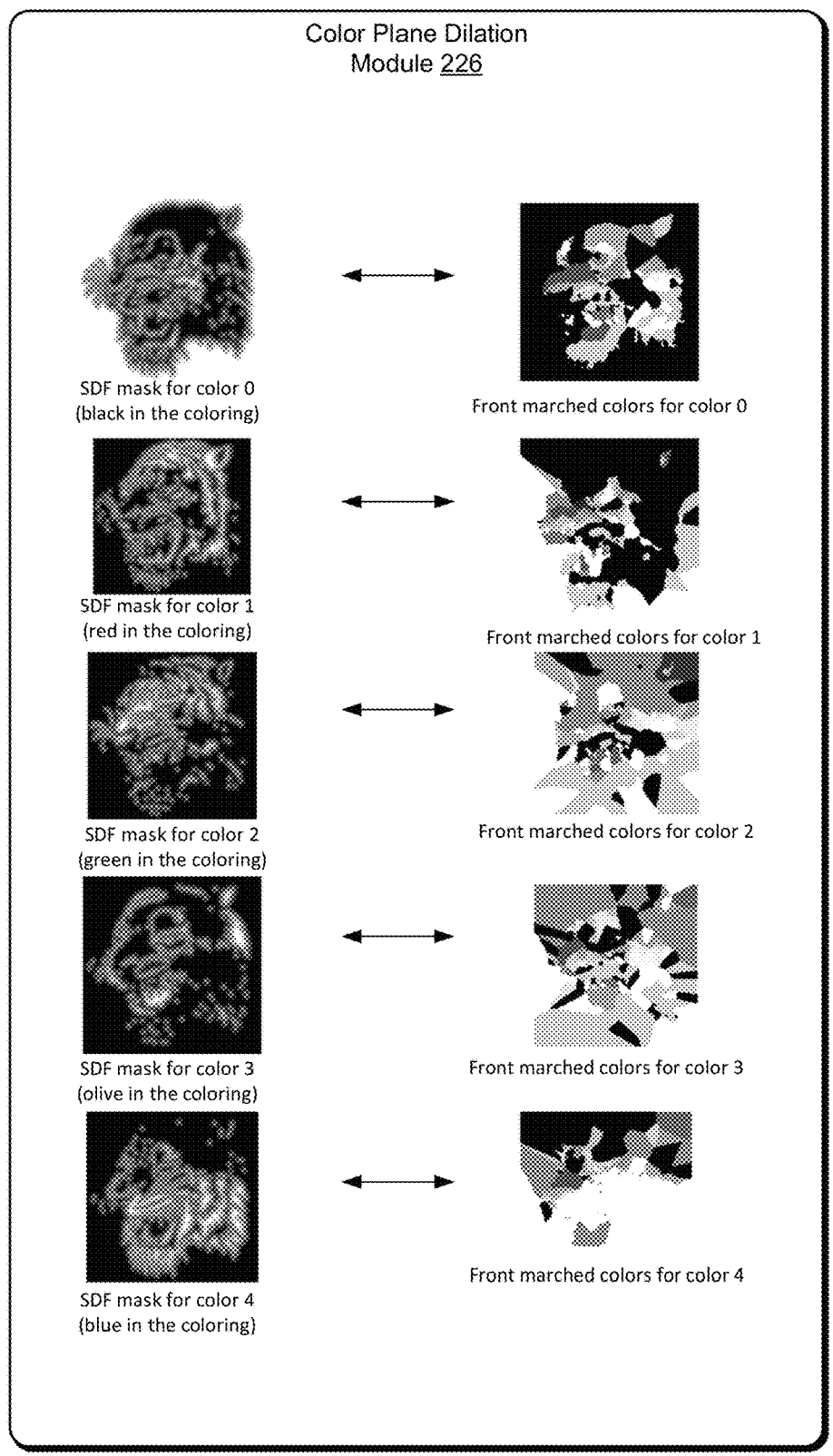
FIG. 8 illustrates an example color plane dilation module in accordance with one or more embodiments.

Having considered some general principles of dilation, consider now FIG. 8 which shows the resultant dilated color plane for each corresponding SDF mask. Specifically, each of the corresponding SDF masks for each color has a corresponding dilated color plane designated "Front marched colors for color X", where "X" can be any of the colors 0-4.

At this point, the SDF images and the color plane images (whether 8 images in total for the 4-color case, or 10 images total for the 5-color case) could be combined to synthesize the source image rasterization exactly. That is, for each synthesized pixel, a shader, e.g. shader 214 (FIG. 2), samples each SDF and then selects a color from the color plane corresponding to the SDF whose sample yielded the largest positive value. In other words, for each given pixel each SDF is analyzed. A color from the corresponding color plane is selected that corresponds to a value that indicates that the given pixel is "most inside" its region. If one has full resolution SDFs and full resolution color planes, the combination of those will provide a bit-for-bit original image.

Down Sample Module—228

Once the source image is converted to the mask/color plane pairs, and processed as described above, the mask/color plane pairs can be arbitrarily down sampled, by down sample module 228, as a form of compression. In doing so, features from the original source image will become lost as the masks/color plane pairs become smaller, but an approximation of the original source image will still remain that includes and retains hard edges and does not alias which, in turn, mitigates visual anomalies provided by the previous solutions. This is due to the use of the SDFs in selecting the corresponding color to use in the down sampling process.

In operation, the SDFs and/or the color planes can be down sampled. At this point, the SDFs/color planes only approximate the original rasterization. However, synthesis based on the down sampled SDFs/color planes retain hard edges in most cases, and the approximation can be very close to the original. In one or more embodiments, synthesis based on the down sampled SDFs/color planes can be performed by, for each desired resultant pixel, performing a linear interpolated sampling of each SDF image and then sampling the color plane corresponding to the SDF whose sample had the highest value. The approximation of the original source image that retains the hard edges is due, at least in part, because the SDFs whose values were zero defined the boundaries or edges in the original source image. In various embodiments, the bilinear filtering (i.e. interpolation) performed in the down sampling process used these SDF values in the interpolation process to result in bilinear curves along these boundaries, thus resulting in a reduced image. In various embodiments, bilinear interpolation and the use of thresholds as described above yields hard edges in the reduced image which, in turn, eliminates or greatly mitigates visually-perceptible anomalies that a user would find distracting, inaccurate and visually displeasing which retains these hard edges.

Having considered the embodiments described above, consider now an example method in accordance with one or more embodiments.

Example Method

Figure 9:
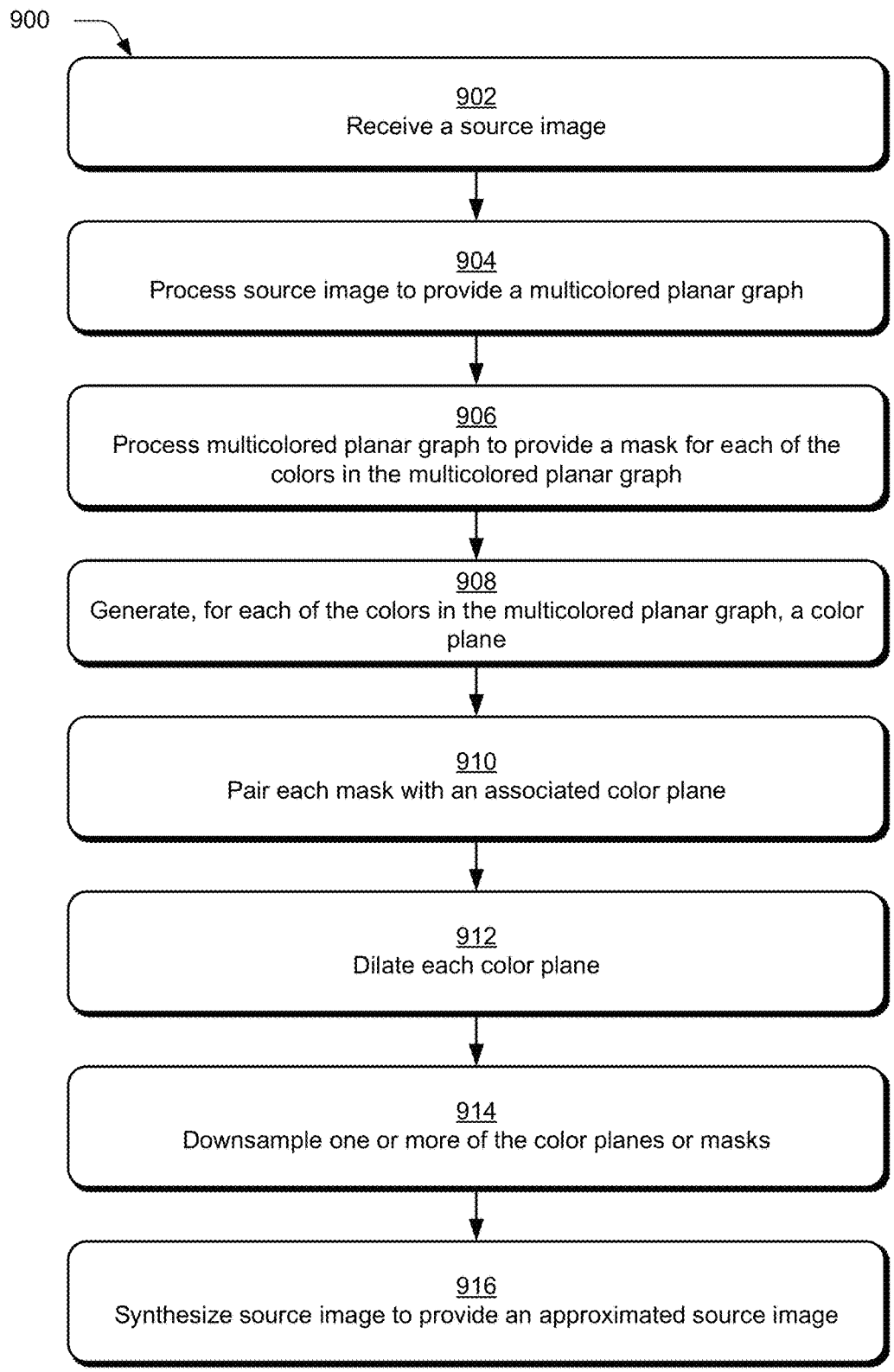
FIG. 9 is a flow diagram depicting a procedure in an example implementation in which multicolored vector art can be approximated through the use of masks, e.g., signed distance field (SDF) masks.

FIG. 9 is a flow diagram depicting an example procedure 900 in which signed distance fields (SDFs) can be used to approximate multicolored vector art in accordance with one or more embodiments. The method can be performed in accordance with any suitable hardware, software, firmware, or combination thereof. In at least some embodiments, the method can be performed by a system, such as the system shown and described in FIG. 2.

At block 902, a source image is received. Any suitable source image can be received. In the illustrated and described embodiments above, the source image is represented as multicolored vector art. At block 904, the source image is processed to provide a multicolored planar graph. Examples of how this can be done are provided above. At block 906, the multicolored planar graph is processed to provide a mask for each of the colors in the multicolored planar graph. Any suitable mask can be utilized. In the embodiments described above, masks in the form of SDF masks are generated from the multicolored planar graph.

At block 908, for each of the colors in the multicolored planar graph, a color plane is generated. An example of a color plane is described above. Each mask is then paired with a corresponding color plane at block 910. In one or more embodiments, each color plane can be dilated at block 912. Examples of how and why this is done are provided above. At block 914, one or more of the color planes or masks can be down sampled and the down sampled color planes and/or masks can be processed to synthesize, at block 916, a source image which provides an approximated source image.

The embodiments and processing described above improve the state-of-the-art in different ways. First, the approximated source image is not aliased and hard edges are retained. This is due, in part, because of the use of the SDF for color plane masking. This provides an accurate, visually-pleasing result. Further, vector art of arbitrary complexity can be reduced to a fixed number of textures at a fixed resolution. Further, rendering a given piece of art scales only with texture resolution, and not with the art complexity.

Furthermore, from a processing standpoint, only a single rendering pass is utilized, regardless of the number of colors in the original vector art. Thus, multicolored SDFs render extremely quickly and efficiently. That is, in a typical vector art rendering scenario, multiple layers associated with a particular image may have to be layered, one atop the other, resulting in multiple passes. In the present situation, only a single rendering pass is utilized. This makes processing very easy for the GPU which, in turn, is easily translatable into the three-dimensional space with no modifications, including non-linear effects such as perspective. The techniques can be used anywhere a typical texture is used in a 3D environment. Further, and perhaps more importantly, rendering speed is not affected by the complexity of the image. This results, for the most part, in a rendering speed that is fairly constant regardless of the complexity of the actual vector art. Previous approaches have not been able to achieve this because, as the complexity of the vector art increases, rendering speed in the previous approaches has been slowed greatly.

The innovations described above result in greatly reduced processing complexities and increases in efficiencies. Furthermore, the shader utilized by the GPU is extremely simple and will work well even on very low-end GPUs.

Example System and Device

FIG. 10 illustrates an example system generally at 1000 that includes an example computing device 1002 that is representative of one or more computing systems and/or devices that may implement the various techniques described herein. This is illustrated through inclusion of the image processing system 104, graphics processing unit module 112, and the multicolored vector approximation module module 114. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

The techniques and systems described above enable signed distance fields (SDFs) to be used to approximate multicolored vector art. A source image, represented as multicolored vector art, is received and processed to provide a multicolored planar graph. The graph is processed to provide a SDF mask for each of the colors in the graph. For each of the colors in the graph, a color plane is generated, paired with the corresponding mask and represents the source image's color underneath the mask. Each color plane can be dilated and then one or more of the color planes or masks can be down sampled and then used to synthesize a source image which provides an approximated source image which retains the hard edges of the original image.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to perform image processing, a method implemented by at least one computing device, the method comprising:

receiving, by the at least one computing device, a source image represented as multicolored vector art using three or more colors;

processing, by the at least one computing device, the source image to provide a multicolored planar graph;

processing, by the at least one computing device, the multicolored planar graph to provide a mask for a color of the multicolored planar graph;

generating, by the at least one computing device, a color plane for the color in the multicolored planar graph;

pairing, by the at least one computing device, the mask with the color plane;

down sampling, by the at least one computing device, at least one of the color plane and the mask; and synthesizing, by the at least one computing device, an approximation of the source image as a plurality of pixels by sampling the mask for values associated with a pixel of the plurality of pixels, and selecting a particular color from the color plane based on the values.

2. The method as described in claim 1, wherein the mask comprises a signed distance field (SDF) mask.

3. The method as described in claim 1, further comprising dilating the color plane.

4. The method as described in claim 1, wherein no two regions that touch within the multicolored planar graph have a same color.

5. The method as described in claim 1, wherein the multicolored planar graph uses four colors to represent the source image.

6. The method as described in claim 1, wherein the multicolored planar graph uses five colors to represent the source image.

7. The method as described in claim 1, wherein the color plane represents color data of the source image associated with the color in the multicolored planar graph.

8. The method as described in claim 1, wherein the approximation of the source image retains hard edges of the source image.

9. In a digital medium environment to perform image processing, a system comprising:

a graph builder module implemented at least partially in hardware of at least one computing device to process a source image to provide a multicolored planar graph, the source image being other than monochrome and represented as multicolored vector art;

a signed distance field mask builder module implemented at least partially in hardware of at least one computing device to process the multicolored planar graph to provide a signed distance field (SDF) mask for a color of the multicolored planar graph;

a color plane generation module implemented at least partially in hardware of at least one computing device to generate a color plane for the color in the multicolored planar graph effective to enable pairing of the SDF mask with the color plane; and a down sample module implemented at least partially in hardware of at least one computing device to enable use of the color plane and SDF mask to synthesize an approximation of the source image as a plurality of pixels by down sampling at least one of the color plane and the SDF mask and processing the at least one of the color plane and the SDF mask by sampling the SDF mask for values associated with a pixel of the plurality of pixels, and selecting a particular color from the color plane based on the values.

10. The system as described in claim 9, wherein the multicolored vector art uses three or more colors.

11. The system as described in claim 9, further comprising a color plane dilation module implemented at least partially in hardware of at least one computing device to dilate the color plane.

12. The system as described in claim 9, wherein no two regions that touch within the multicolored planar graph have a same color.

13. The system as described in claim 9, wherein the multicolored planar graph uses four colors to represent the source image.

14. The system as described in claim 9, wherein the multicolored planar graph uses five colors to represent the source image.

15. The system as described in claim 9, wherein the color plane represents color data of the source image associated with the color in the multicolored planar graph.

16. The system as described in claim 9, wherein the approximation of the source image retains hard edges of the source image.

17. In a digital medium environment to perform image processing, a system comprising:
   means for processing a source image to provide a multicolored planar graph, the source image being represented as multicolored vector art using three or more colors, the multicolored planar graph employing at least five colors to represent the source image;
   means for processing the multicolored planar graph to provide a signed distance field (SDF) mask for a color of the multicolored planar graph;
   means for generating a color plane for the color in the multicolored planar graph;
   means for pairing the SDF mask with the color plane; and
   means for using the color plane and SDF mask to synthesize an approximation of the source image as a plurality of pixels by down sampling at least one of the SDF mask and the color plane and processing the at least one of the SDF mask and the color plane for values associated with a pixel of the plurality of pixels, and selecting a particular color from the color plane based on the values.

18. The system as described in claim 17 further comprising means for dilating the color plane.

19. The system as described in claim 17, wherein no two regions that touch within the multicolored planar graph have a same color.

20. The system as described in claim 17, wherein the color plane represents color data of the source image associated with the color in the multicolored planar graph.

* * * * *